United States Patent [19]
Kerr

[11] Patent Number: 4,648,098
[45] Date of Patent: Mar. 3, 1987

[54] SIGNAL GENERATOR AND CORRELATOR FOR RECEIVING MINIMUM SHIFT KEYED DATA

[75] Inventor: Leo A. Kerr, Woodstock, Md.

[73] Assignee: Allied Corporation, Morristown, N.J.

[21] Appl. No.: 682,629

[22] Filed: Dec. 17, 1984

[51] Int. Cl.[4] ............................................. H04L 27/12
[52] U.S. Cl. ........................................ 375/47; 375/64; 375/90
[58] Field of Search .................... 375/1, 38, 45, 47, 49, 375/64, 88, 90, 2.1; 332/16 R; 329/131; 178/22.01, 22.19

[56] References Cited

U.S. PATENT DOCUMENTS

| | | | |
|---|---|---|---|
| 4,500,856 | 2/1985 | Childs | 375/47 |
| 4,539,533 | 9/1985 | French | 375/47 |

OTHER PUBLICATIONS

*Digital Communications by Satellite*, Bhargava et al., Wiley & Sons, 1981, chapter 9, section 9.1.
Part No. R5401 Reticon Corporation, Wellesley, Mass.
E. J. Kelly, "Sampled-Data Receiver Design & Performance for BPSK & MSK Spreading Modulations", Technical Report 550, Lincoln Laboratory, Massachusetts Institute of Technology, Jan. 19, 1981, pp. 54.

*Primary Examiner*—Jin F. Ng
*Assistant Examiner*—Raymond C. Glenny
*Attorney, Agent, or Firm*—Robert M. Trepp; Bruce L. Lamb

[57] ABSTRACT

A minimum shift keyed reference signal generator is described (FIG. 3) incorporating a shift register, for holding a spreading function, a first and second memory for holding in-phase and quadrature weights, a counter for addressing the first and second memory and first and second Exclusive OR circuits for combining the weights when addressed by the counter with the spreading function held in the shift register. A minimum shift keyed correlator is described (FIGS. 5A, 5B) incorporating a minimum shift keyed reference signal generator for generating in-phase and quadrature weights, an oscillator and first and second mixers for deriving the in-phase and quadrature component of a received minimum shift keyed signal, sample and hold means for sampling the in-phase and quadrature signal, a plurality of shift registers for holding the in-phase and quadrature signal, a plurality of shift registers for holding the in-phase and quadrature weights of the reference signal, a plurality of switches for coupling the received in-phase and quadrature signals to plus and minus buses according to the reference signal in respective bits of the shift registers, subtractor circuits for subtracting the plus bus from the minus bus and adders for adding the output of the subtractor circuits together and means for determining the magnitude of the in-phase and quadrature components whereby the product of the reference signal and the received signal including in-phase and quadrature components is determined. The invention overcomes the problem of a reference signal having a plurality of amplitudes requiring amplitude multiplying circuits for correlating minimum shift keyed data.

23 Claims, 19 Drawing Figures

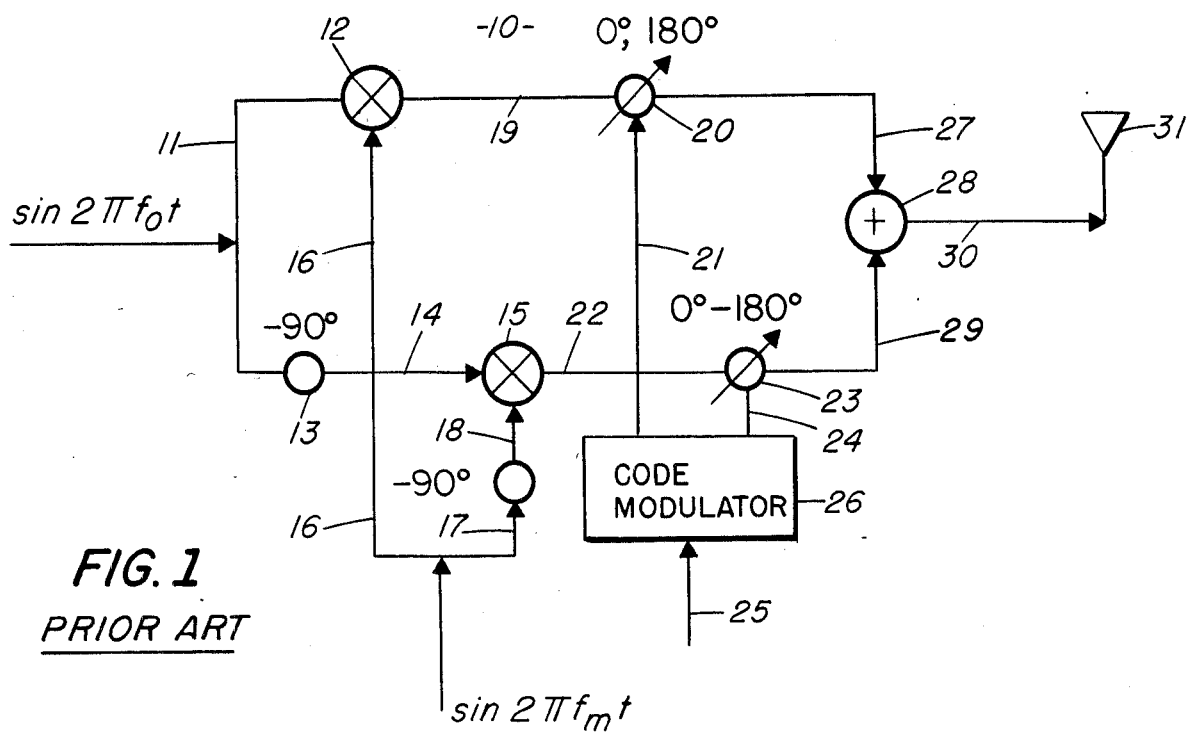
FIG. 1
PRIOR ART
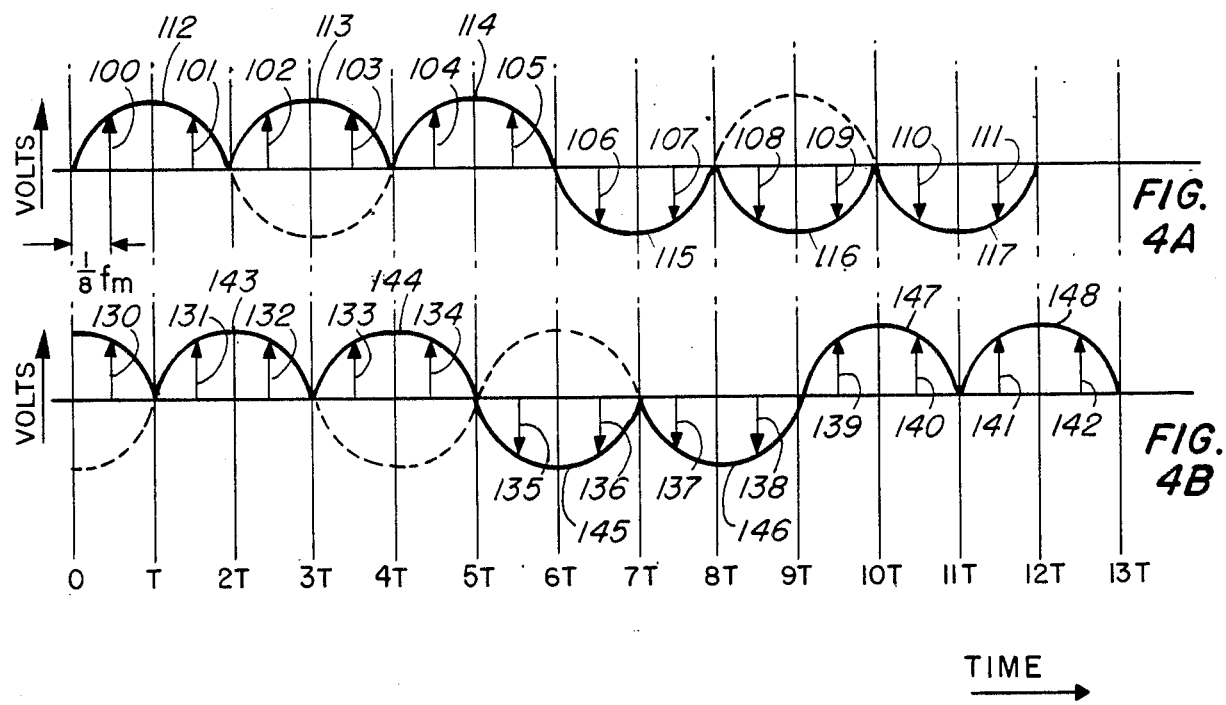

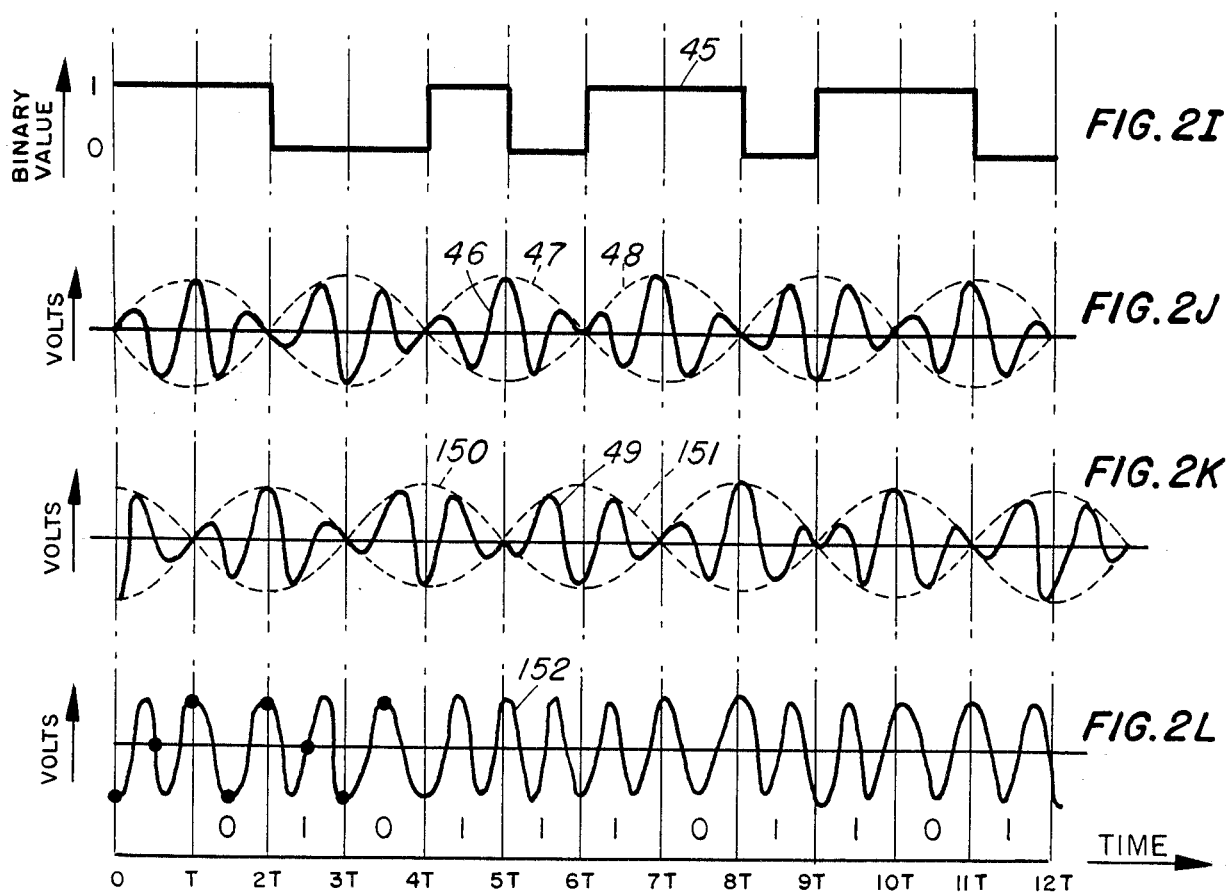
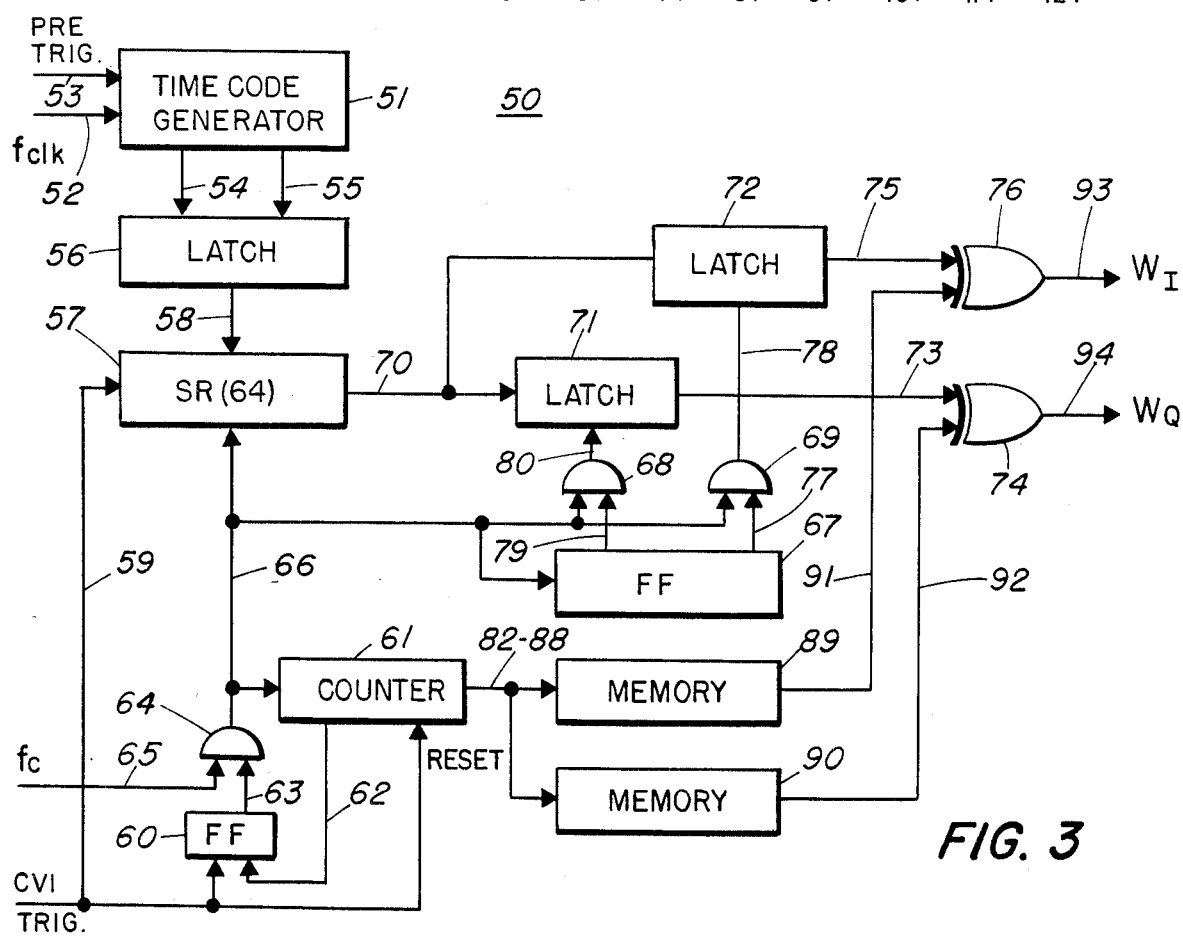

SIGNAL GENERATOR AND CORRELATOR FOR RECEIVING MINIMUM SHIFT KEYED DATA

BACKGROUND OF THE INVENTION

1. Field of the Invention

This invention relates to communication equipment and more particularly to a reference signal generator and correlator for receiving minimum shift keyed data.

2. Description of the Prior Art

Communication equipment may use minimum shift key (MSK) modulation wherein a spreading function, such as a pseudo-random noise, is used to provide a plus or minus 90° phase shift to the carrier at the MSK modulation rate (chipping rate). Binary phase shift keyed (BPSK) and quaternary phase shift keyed (QPSK) modulations also provide spreading functions, such as pseudo-random noise, by shifting the phase 0° or 180° or 0°, 90°, 180°, 270° of the carrier signal in response to the spreading function code. Pseudo-random noise spreading functions are used for secure communications using a rapidly changing pseudo-random noise code which may change after one second or less. The rapidly changing code provides a low probability of intercept (LPI) to the message, inhibiting exploitation, spoofing and jamming. MSK modulation is desired because it permits more information for a given bandwidth. MSK requires more complex hardware, however, since the modulating signal is complex having an in-phase and quadrature component which generally limits the speed of operation.

Presently pseudo-random noise spreading function codes with BPSK modulation and moderately high chipping rates are correlated in surface acoustic wave (SAW) convolvers or programmable surface acoustic wave correlators at intermediate frequencies. The surface acoustic wave convolvers and programmable surface acoustic wave correlators are very expensive in small quantities and may not be practical for MSK modulation.

Another technique for receiving BPSK modulation involves translating the received signals to baseband and processing them digitally for both in-phase (I) and quadrature (Q) components of the signal. To achieve significant dynamic range, such as 60 db or more, an analog-to-digital converter with ten bit resolution or more is necessary. Both the analog-to-digital converter and digital processing for ten bits resolution in a BPSK correlator is complex, expensive, slow, bulky and consumes a lot of power. For receiving MSK modulation, the circuitry is doubled because of the complex number samples of the correlation reference.

Presently, a semiconductor device has been developed for receiving BPSK modulation. The device is manufactured by Reticon Corporation, a subsidiary of EG & G, Inc. located in Wellesley, Mass., bearing part number R5401, which performs correlation between a programmable binary function and an analog input signal. The programmable binary function is stored in a 64 sample static binary register. Each binary sample controls a switch for coupling data coupled to a corresponding terminal for a 64 sample dynamic analog register to a plus or minus sum bus. The analog signal is sampled and loaded into the 64 sample dynamic register. The plus and minus sum bus provide a correlation output with respect to the 64 sample static binary register to the 64 sample dynamic analog register. The device R5401, is applicable to radars using barker or pseudo-random codes and to spread spectrum for anti-jam communications. For BPSK modulation, 64 samples (in-phase) are loaded into the analog register. Sixty-four samples of the binary reference signal at baseband are loaded into the binary register. Each bit of the binary reference controls a single pole, double throw (SPDT) switch with the single pole coupled to the respective tap of the analog register. If the reference bit is a 1, the analog signal at the respective tap is switched to a plus bus; if a zero, the analog signal at the respective tap is switched to a negative bus. The two buses sum the analog signal inputs and are coupled to respective inputs of a difference amplifier. The output of the difference amplifier is then the correlated BPSK signal at the reference phase of the baseband input signal. The quadrature phase samples (Q) can be obtained in a similar way. By taking the magnitude such as by the square root of the sum of the squares of the in-phase and quadrature signal, the correlated signal may be obtained.

A device such as R5401 works for BPSK since the reference signal is a binary code spreading function, with constant amplitude bits. The samples of this waveform must effectively weight the analog signal at each respective tap by multiplying the weight and the analog signal together. The multiplication is accomplished by simply switching the analog signals at the taps to either the plus or minus sum buses. While the BPSK reference signal is binary and has constant amplitude bits, the MSK reference signal is neither a replica of binary code, real only, or of constant amplitude.

In a publication of F. J. Kelly, "Sampled-Data Receiver Design and Performance for BPSK and MSK Spreading Modulations", Technical Report 550, Lincoln Laboratory, Massachusetts Institute of Technology, Jan. 19, 1981, an analysis of receiver performance is described in terms of SNR loss due to sampling. Table IV at page 33 indicates the average signal-to-noise ratio loss when sampling at 1, 2 and 4 times the chip rate with a filter matched to the MSK pulse.

It is therefore desirable to generate a minimum shift keyed reference signal which is constant amplitude and binary.

It is further desirable to provide a minimum shift keyed reference signal which may utilize a correlation device such as R5401 manufactured by the Reticon Corporation located in Wellesley, Mass.

It is further desirable to generate a MSK reference signal at baseband from the code and sample the complex MSK signal received so that all weights are of equal magnitude, plus and minus signals.

It is further desirable to use a MSK reference signal at baseband where all weights are of equal magnitude, plus and minus, using a plurality of correlation devices for receiving MSK signals.

It is further desirable to provide a correlator for receiving minimum shift keyed data utilizing a signal generator for generating a MSK reference signal from a predetermined code where all weights are of equal magnitude, plus and minus signals.

SUMMARY OF THE INVENTION

An apparatus and method is described for generating an in-phase and quadrature reference signal of a minimum shift keyed modulated waveform comprising a shift register for holding a spreading function represented by a plurality of binary bits, a first memory for holding samples of a sine wave function sampled at predetermined time intervals, the time intervals evenly spaced apart, a second memory for holding samples of a cosine wave function sampled at the predetermined time intervals, a counter for addressing the first and second memories as a function of time at a predetermined frequency, a clock for shifting the shift register at the predetermined frequency, a first Exclusive OR circuit for combining each odd bit from the shift register with each of two consecutive output bits from the first memory to provide an in-phase reference signal and a first Exclusive OR circuit for combining each even bit from the shift register with each of two consecutive output bits from the second memory to provide a quadrature reference signal.

The invention further provides an apparatus and method for receiving minimum shift keyed data signals occurring at a predetermined carrier frequency and chip rate comprising the steps of mixing the signal with an in-phase and quadrature signal at the carrier frequency to provide an in-phase signal and a quadrature baseband signal, sampling the in-phase and quadrature signal at a predetermined chip rate, storing the sampled in-phase signals in first and second shift registers, storing the sampled quadrature signals in third and fourth shift registers, generating a predetermined binary code, multiplying the code by predetermined first binary weights for each chip to provide a first binary reference signal, storing the first binary reference signal in a fifth and sixth shift register, multiplying the code by predetermined second binary weights for each chip to provide a second binary reference signal, storing the second binary reference signal in seventh and eighth shift registers, coupling samples in the first shift register to a first bus at times the first binary reference signal in respective bit positions of the fifth shift register are a 1 and to a second bus at times the first binary reference signal in respective bit positions of the fifth shift register are a zero, subtracting the signal on the second bus from the first bus to provide a first signal, coupling samples in the fourth shift register to a third bus at times the second binary reference signal in respective bit positions of the eighth shift register are a 1 and to a fourth bus at times the second binary reference signal in respective bit positions of the eighth shift register are a zero, subtracting the signal on the fourth bus from the third bus to provide a second signal, adding the first and second signals together to provide a third signal, coupling samples in the second shift register to a fifth bus at times the second binary reference signal in respective bit positions of the seventh shift register are a 1 and to a sixth bus at times the second binary reference signal in respective bit positions of the seventh shift register are a zero, subtracting the signal on the fifth bus from the signal on the sixth bus to provide a fourth signal, coupling samples in the third shift register to a seventh bus at times the first binary reference signal in respective bit positions of the sixth shift register are a 1 into an eighth bus at times the first binary reference signal in respective bit positions of the sixth shift register are a zero, subtracting the signal on the eighth bus from the signal on the seventh bus to provide a fifth signal, adding the fourth and fifth signals together to provide a sixth signal, generating a signal indicative of the magnitude of the third signal and the sixth signal where one signal is complex to provide a seventh signal indicative of the correlated output.

BRIEF DESCRIPTION OF THE DRAWING

FIG. 1 is a schematic diagram of apparatus for generating minimum shift keyed waveforms.

FIGS. 2A–2L show typical waveforms at circuit nodes within the apparatus of FIG. 1.

FIG. 3 is one embodiment of the invention.

FIGS. 4A–4B show typical waveforms at circuit nodes within the embodiment of FIG. 3.

DESCRIPTION OF THE PREFERRED EMBODIMENT

Figure 2A:
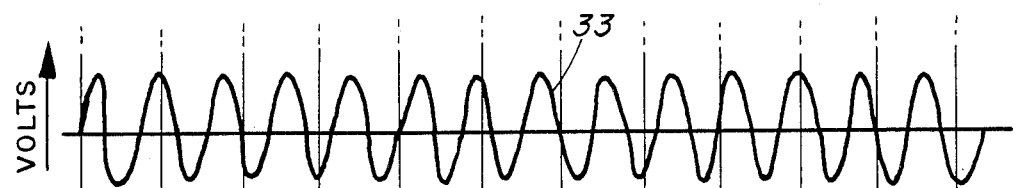
Figure 2B:
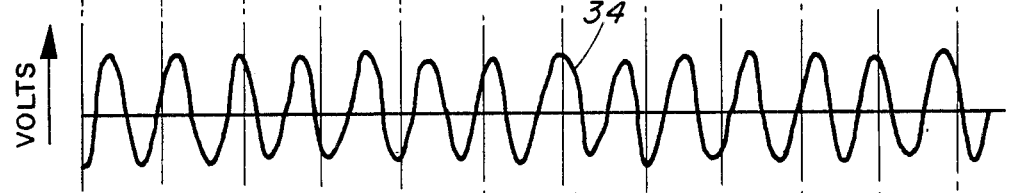

Referring to FIG. 1, waveform generator 10 of the prior art is shown for generating minimum shift keyed spread spectrum waveforms. An input signal is coupled over line 11 to an input of mixer 12 and an input of phase shifter 13. The input signal may be represented by sin $2\pi f_0 t$ which is shown by curve 33 in FIG. 2A. In FIGS. 2A–2L the ordinate represents voltage and the abscissa represents time. Phase shifter 13 functions to provide a $-90°$ phase shift to the input signal. The output of phase shifter 13 is coupled over line 14 to an input of mixer 15. The signal on line 14 may be represented by sin $(2\pi f_0 t - \pi/2)$ which is equal to $-\cos(2\pi f_0 t)$ which is shown by curve 34 in FIG. 2B. A modulation frequency signal, represented by sin $2\pi f_m t$ is coupled over line 16 to a second input of mixer 12 and through phase shifter 17 over line 18 to a second input of mixer 15. Phase shifter 17 functions to provide a $-90°$ phase shift to the modulation frequency signal. The waveform on line 16 is shown by curve 35 in FIG. 2C and the waveform on line 18 is shown by curve 36 in FIG. 2D. The output of mixer 12 is coupled over line 19 to an input of phase shifter 20. Phase shifter 20 may provide a phase shift to the frequency $f_0$ of zero or 180°, depending upon the control signal to phase shifter 20 on line 21. The output of mixer 15 is coupled over line 22 to an input of phase shifter 23. Phase shifter 23 provides a phase shift to the frequency $f_0$ of zero or 180°, depending upon the control signal on line 24. An example of the waveforms on lines 19 and 22 are shown by curves 37 and 40 in FIGS. 2E and 2F, respectively. An example of the waveforms on lines 21 and 24 are shown by curves 43 and 44 in FIGS. 2G and 2H, respectively. A code, such as 110010110110 is coupled over line 25 to an input of code modulator 26. The waveform of the code coupled on line 25 may be shown, for example, by curve 45 in FIG. 2I. Code modulator 26 functions to couple alternating bits of the code on line 25 to lines 21 and 24. The code change on line 21 may occur every 180° of the modulation frequency $f_m$ and is synchronized to occur when the waveform crosses zero. Likewise, the code on line 24 may change every 180° of $f_m$ and is synchronized to occur when the waveform on line 22 crosses zero. The output of phase shifter 20 is coupled over line 27 to an input of adder 28. The output of phase shifter 23 is coupled over line 29 to a second input of adder 28. Adder 28 functions to combine the waveforms on lines 27 and 29, which are shown by curves 46 and 49 in FIGS. 2J and 2K, respectively. Curves 47, 48 and 150, 151 are the envelopes of waveforms 46 and 49, respectively. The output of adder 28 is coupled over line 30 to antenna 31, which radiates the signal on line 30. The MSK signal from line 30 is shown by curve 152 in FIG. 2L.

Referring to FIG. 3, a reference signal generator 50 is shown. Code generator 51 functions to provide the binary code or spreading function which is used by the signal expected to be received. Code generator 51 has a clock signal $f_{clk}$ coupled over line 52. Code generator 51 has a control signal PRETRIG coupled over line 53 which functions to initiate the generation of the code 64 bit which is transferred serially on line 55 to the latch 56 by means of 64 clock signals on line 54. Latch 56 holds the 64 bit code and presents the code to shift register 57 over line 58 which may be a bus of 64 lines. Shift register 57 loads the 64 bit code upon receiving control signal CVI TRIG which stands for Code Validity Interval Trigger over line 59. Shift register 57 may be of the parallel in serial out type, for example. Line 59 is also coupled to a control input of flip flop 60 and a reset of input counter 61. Counter 61 has an output coupled over line 62 to the set input of flip flop 60. Flip flop 60 has an output coupled over line 63 to an input of AND gate 64. A clock signal $f_c$ is coupled over line 65 to a second input of AND gate 64. The output of AND gate 64 is coupled over line 66 to the clock input of counter 61 and the clock input of shift register 57. Further, line 66 is coupled to the clock input of flip flop 67 and to an input of AND gates 68 and 69. The output of shift register 57 is coupled over line 70 to the data inputs of latch 71 and latch 72. The output of latch 71 is coupled over line 73 to an input of Exclusive OR circuit 74. The output of latch 72 is coupled over line 75 to an input of Exclusive OR circuit 76. Flip flop 67 has its true output coupled over line 77 to a second input of AND gate 69. The output of AND gate 69 is coupled over line 78 to the clock input of latch 72. The complement output of flip flop 67 is coupled over line 79 to a second input of AND gate 68. The output of AND gate 68 is coupled over line 80 to the clock input of latch 71. Counter 61 has an output coupled over lines 82–88 which may, for example, couple to six bits of counter 61, which are coupled to the address input of memories 89 and 90 which may be, for example, random access or read only memories. The output waveforms of memories 89 and 90 may be generated other ways, such as by a logic gate decoder of the signals on lines 82–88. The output of memory 89 is coupled over line 91 to a second input of Exclusive OR circuit 76. The output of memory 90 is coupled over line 92 to a second input of Exclusive OR circuit 74. Exclusive OR circuit 76 has an output on line 93 which is the in-phase reference signal at baseband for decoding a MSK modulated waveform. The output of Exclusive OR circuit 74 is coupled over line 97 which is the quadrature phase reference signal at baseband for a MSK modulated waveform.

To implement a correlator for MSK modulation, the time sample of the MSK signal to be correlated and the time sample of the MSK reference signal must be at the same sampling rate. The sampling rate must be chosen high enough to prevent significant sampling loss. Technical Report 550 entitled "Sampled-Data Receiver Design and Performance for BPSK and MSK Spreading Modulations" by E. J. Kelly from Lincoln Laboratory, Massachusetts Institute of Technology, dated Jan. 19, 1981, studied the sampling rate for MSK modulation and indicates that sampling at the chip rate is reasonable. For example, at page 33, Table IV indicates a 0.825 db average signal-to-noise ratio (SNR) loss when sampling at the chip rate with a filter matched to the MSK pulse itself. The chip rate is the rate of individual bits in the MSK modulated signal. The envelopes of the bits shown in waveforms 47 and 48 of FIG. 2J begin at zero, 2T, 4T, etc. for the waveform shown by curve 46 in FIG. 2J. The envelopes of the bits shown in waveforms 150 and 151 of FIG. 2K begin at T, 3T, 5T, etc. for the waveform shown by curve 49 in FIG. 2K. Thus, four chips of information are encoded in curve 152 shown in FIG. 2L from time zero to 4T.

Prior to correlating with a reference signal the information encoded in curve 152 in FIG. 2L with its carrier frequency, the carrier frequency is first removed by mixing with an apparent carrier frequency $f_0$ at phase $\phi$ to provide a baseband signal shown for example by waveforms 112–117 and 143–148 in FIGS. 4A and 4B. Since the waveforms 112–117 and 143–148 shown in FIGS. 4A and 4B are made up of segments which are identical, except for phase (polarity), and are symmetrical in adjacent sampling intervals (equal to the chip rate), a sampling phase occurring at the chip rate can be chosen so that all samples are at equal magnitude. Since these are equal magnitude samples of the received desired signal at baseband, this is also the desired reference signal for the correlator.

Because the reference samples are equal in magnitude, and of two polarities, they can be normalized to unity and have the polarity defined by a binary code of ones and zeroes for use in the correlator devices described previously. These baseband, in-phase and quadrature, binary code, reference waveforms are generated by the circuit 50 shown in FIG. 3.

Figure 2C:
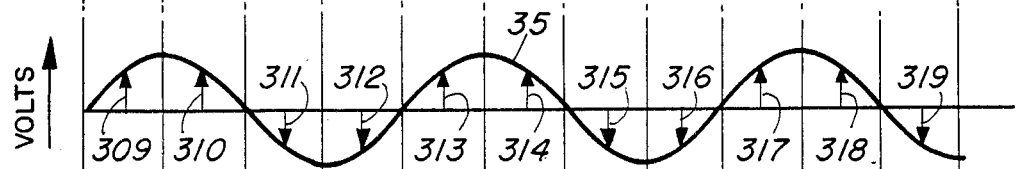
Figure 2D:
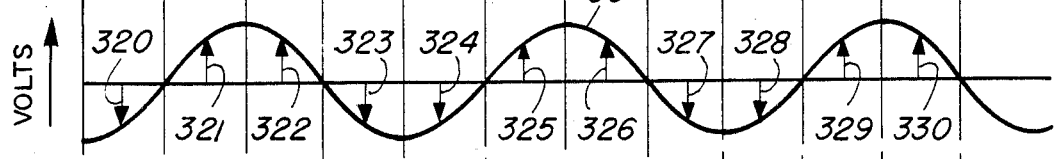
Figure 2E:
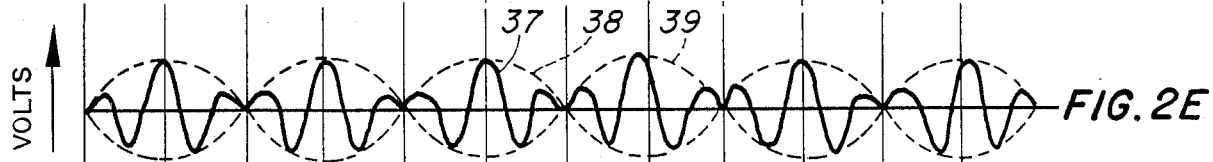
Figure 2F:
Figure 2G:
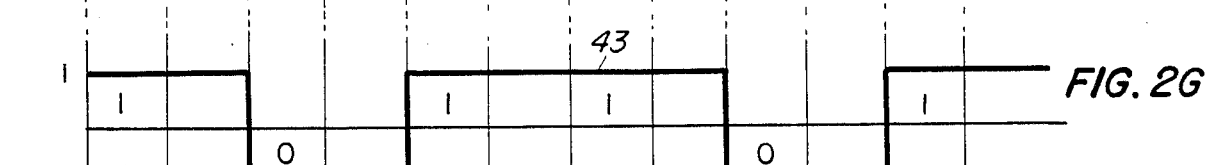
Figure 2H:
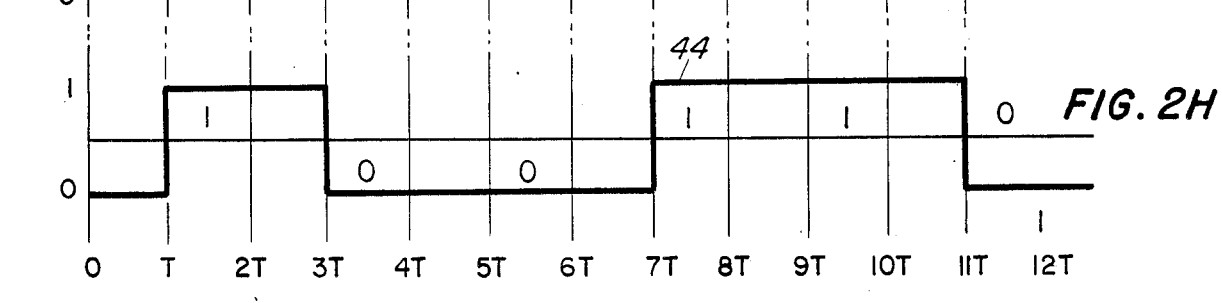

Table I shows the binary code for the sampled sin $2\pi f_m t$ and cos $2\pi f_m t$, shown by arrows 309–319 and 320–330 on waveforms 35 and 36 in FIGS. 2C and 2D respectively, along with the binary code for the sampled, in-phase and quadrature reference signal waveforms 100–111 and 130–142 shown in FIGS. 4A and 4B, respectively. In Table I, $f_m$ is one-fourth the chipping rate.

TABLE 1

| CODE | 1 | 1 | 0 | 0 | 1 | 0 | 1 | 1 | 0 | 1 | 1 | 0 | |
|---|---|---|---|---|---|---|---|---|---|---|---|---|---|
| SIN $2\pi f_m t$ | 1 | 1 | 0 | 0 | 1 | 1 | 0 | 0 | 1 | 1 | 0 | 0 | 1 |
| COS $2\pi f_m t$ | 0 | 1 | 1 | 0 | 0 | 1 | 1 | 0 | 0 | 1 | 1 | 0 | 0 |
| MOD SIN | 1 | 1 | 1 | 1 | 1 | 1 | 0 | 0 | 0 | 0 | 0 | 0 | |
| MOD COS | 1 | 1 | 1 | 1 | 1 | 0 | 0 | 0 | 0 | 1 | 1 | 1 | 1 |
| $2\pi f_m t$ | $\pi/4$ | $3\pi/4$ | $5\pi/4$ | $7\pi/4$ | $\pi/4$ | $3\pi/4$ | $5\pi/4$ | $7\pi/4$ | $\pi/4$ | $3\pi/4$ | $5\pi/4$ | $7\pi/4$ | $\pi/4$ |

The phase or sampling at the chip rate of the waveforms in FIGS. 4A and 4B are chosen at one-half T, three halves T, five halves T, seven halves T, nine halves T, etc. Thus, for sampling the waveform shown by curve 112–117 in FIG. 4A or more simply the waveform shown by curve 35 in FIG. 2C, the sampling weights would be 1 at one-half T, 1 at three halves T, 0 at five halves T, 0 at seven halves T, and 1 at nine halves T, etc. These values are shown in Table I and correspond to the sampling of sin $2\pi f_m t$. Likewise, the sampling of the waveform shown by curve 49 in FIG. 2K or more simply the waveform shown by curve 36 in FIG. 2D corresponds to sampling the waveform cos $2\pi f_m t$.

The sampling provides weights of 0110 at times one-half T, three halves T, five halves T, and seven halves T, respectively. It is noted that the sampling weights are equal in magnitude, except for polarity. The weights are either +1 or −1. This permits a correlation device to be used in a correlator for MSK modulation that can simply change sign and add rather than multiply analog or digital signals representing a plurality of weights.

In FIG. 3 memories 89 and 90 provide samples at the chip rate equal to magnitude taken at times one-half T, three halves T, five halves T, seven halves T, etc. Memory 89 stores sample values as shown in Table I associated with sin $2\pi f_m t$. Memory 90 stores samples as shown in Table I associated with cos $2\pi f_m t$.

The operation of FIG. 3, code generator 51 generates a code such as shown in the top line of Table I, which is latched into latch 56 and into shift register 57 upon signal CVI TRIG on line 59. The code in shift register 57 has 64 bits, for example. At the time the signal on line 59 loads the code into shift register 57, flip flop 60 and counter 61 are reset by signal CVI TRIG. The clock $f_c$ on line 65 is permitted to pass through AND gate 64 to shift register 57 which causes the code to be shifted out on line 70 one bit at a time. Latches 71 and 72 in conjunction with flip flop 67 causes the code to be stored alternately in each latch for two bit periods. The output of latch 72 provides a waveform corresponding to curve 43 in FIG. 2G and the output of latch 71 corresponds to a waveform shown by curve in 44 FIG. 2H. The clock on line 65 also causes counter 61 to count. The output of counter 61 such as six bits is used as an address for memories 89 and 90. The memories are read out corresponding to the appropriate sample time and coupled to Exclusive OR circuits 76 and 74 respectively. The output of Exclusive OR circuit 76 provides a sequence of bits as shown in Table I associated with MOD SIN. The output of Exclusive OR circuit 74 corresponds to a sequence of bits shown in Table I corresponding to MOD COS.

The output of Exclusive OR circuits 76 and 74 are shown in FIGS. 4A and 4B, respectively. In FIGS. 4A and 4B the ordinate represents voltage and the abscissa represents time. Arrows 100-111 represent the samples which correspond to the binary bits shown in Table I associated with MOD SIN. Curve 112-114 represent a waveform for three chips having a positive phase which would correlate with the sample waveforms. Waveforms 115-117 represent three chips of a reference signal having a negative phase. In FIG. 4B arrows 131-142 represent the samples which correspond to the binary bits shown in Table I associated with MOD COS. Waveforms 143 and 144 represent two chips of data with positive phase. Waveforms 145 and 146 represent two chips of data with negative phase. Waveforms 147 and 148 represent two chips of data with positive phase. Arrows 100-111 in FIG. 4A and arrows 131-142 in FIG. 4B shown on waveforms 112-117 and 143-148, respectively, indicates the proper sampling for these waveforms. Since all waveforms are sampled at a phase of equal amplitude, 0.707 peak amplitude, the relative amplitude or scaling factor can be ignored.

When counter 61 sequentially address read only memories 89 and 90 and their outputs are applied to Exclusive OR circuits 76 and 74, representing the modulated waveform samples. For ones and zeroes logic, the Exclusive OR circuit performs the same function as multiplying plus ones and minus ones, equating minus ones to zeroes. The output of Exclusive OR circuits 76 and 74 on line 93 and 94 are the in-phase and quadrature, equal magnitude, sample reference signal representing ones and zeroes or plus ones and minus ones by binary ones and zeroes.

Figure 5A:
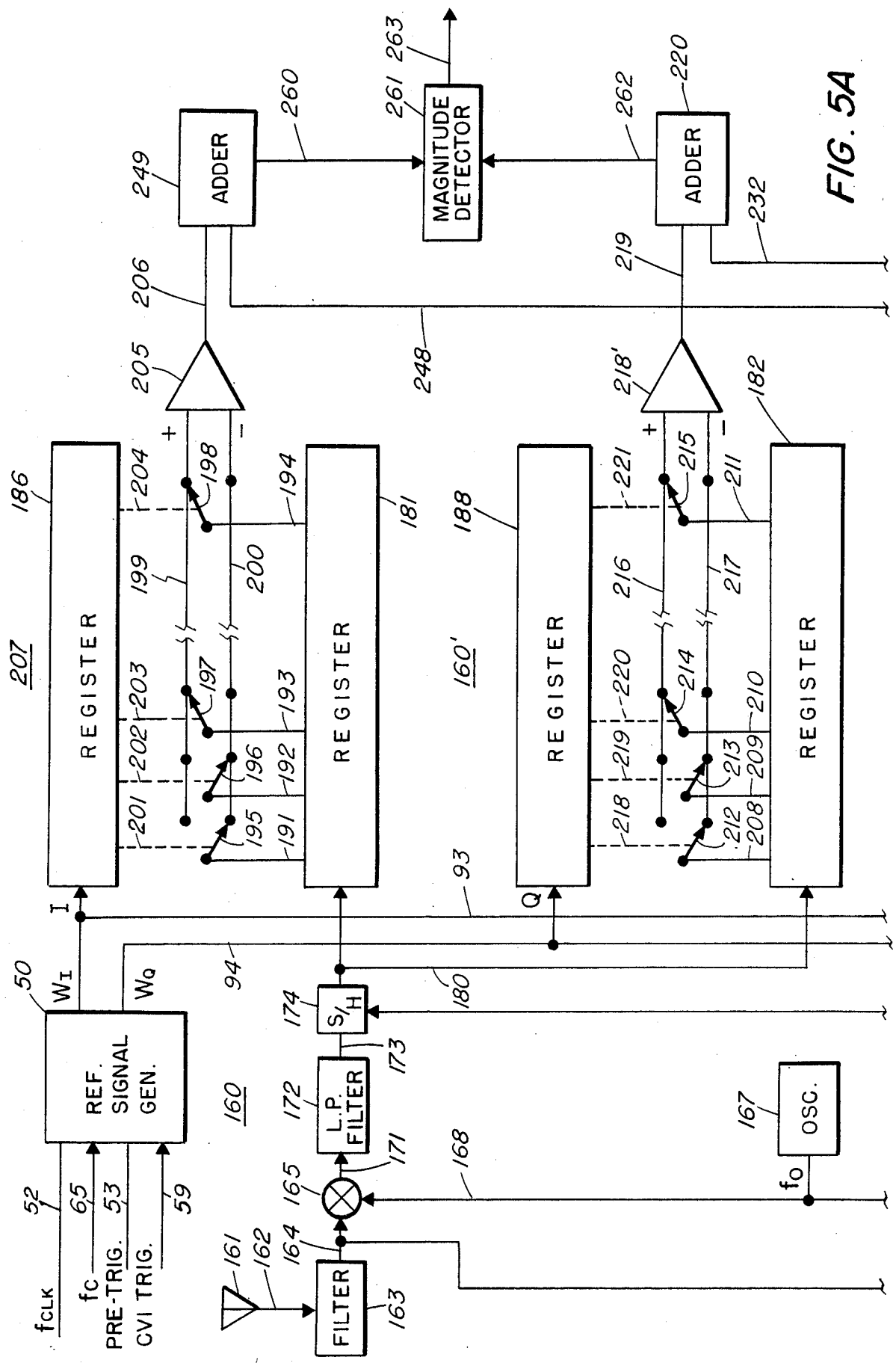
FIGS. 5A and 5B shows a minimum shift keyed receiver utilizing the embodiment of FIG. 3.
Figure 5B:
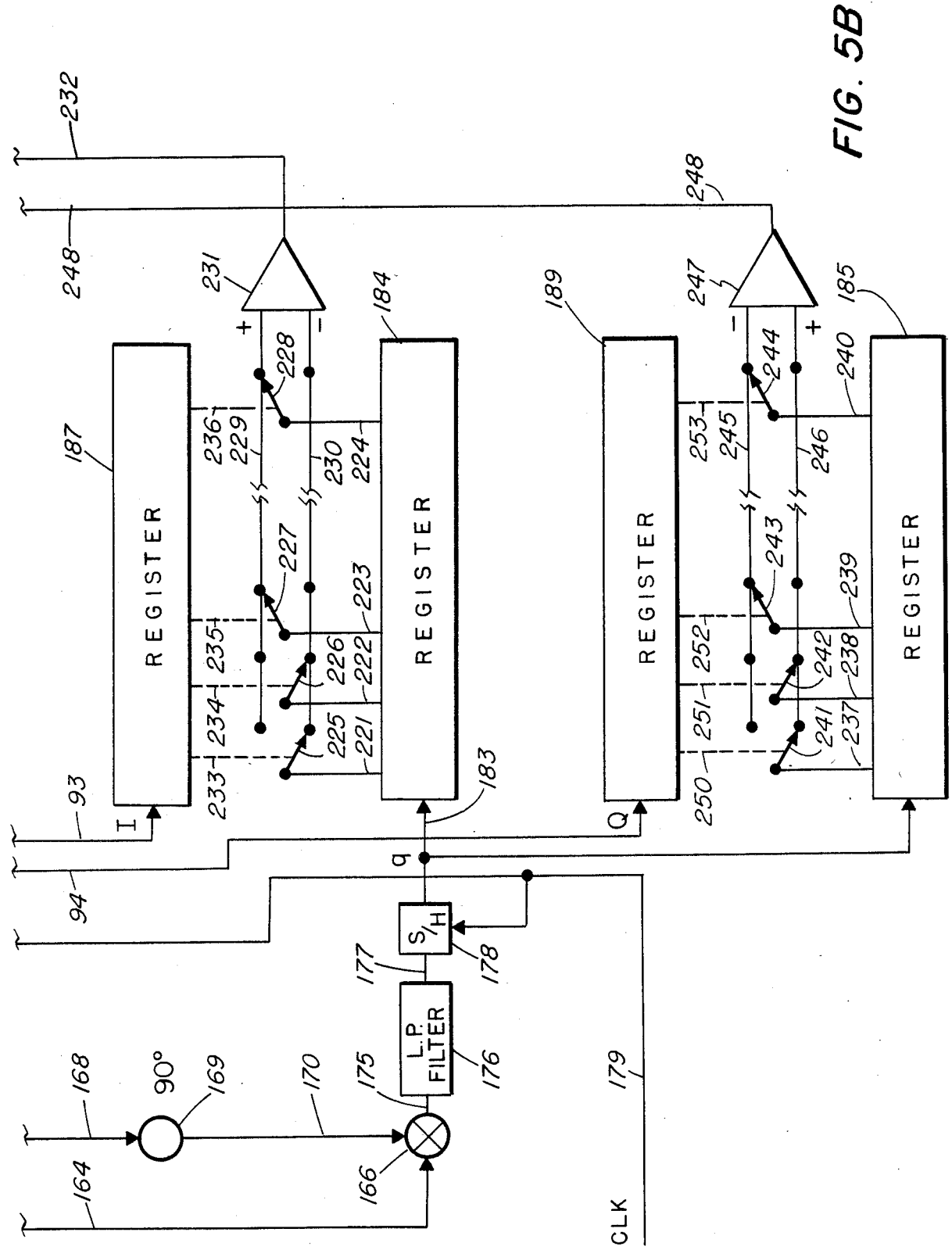

Referring to FIGS. 5A and 5B, a schematic diagram of a minimum shift keyed receiver 160 utilizing the embodiment of FIG. 3 is shown. A MSK signal such as the waveform shown by curve 152 in FIG. 2L is received at antenna 161 and coupled over line 162 to an input of filter 163. The waveform in FIG. 2L may be transposed to any frequency by mixing it with a carrier frequency to provide the waveform at the desired frequency. Filter 163 functions to match the MSK spectrum to the sampling processing for best signal to noise ratio. The output of filter 163 is coupled over line 164 to an input of mixers 165 and 166, which functions to down convert the MSK signal to baseband by using local oscillator 167. Local oscillator 167 is equal to the apparent carrier frequency $f_0$ and is coupled to mixer 165 over line 168. The apparent carrier frequency $f_0$ would be the carrier frequency $f_0$, shown in FIG. 1, used to generate the MSK signal, if known. Phase shifter 169 is coupled to line 168 and functions to provide a −90° phase shift to the signal on line 168. The output of phase shifter 169 is coupled over line 170 to an input of mixer 166. The output of mixer 165 is coupled over line 171 to an input of low pass filter 172. The output of low pass filter 172 is coupled over line 173 to an input of sample and hold circuit 174. Sample and hold circuit 174 samples the in-phase signal on line 173 at the chip rate. The output of mixer 166 is coupled over line 175 through low pass filter 176 over line 177 to sample and hold circuit 178. Sample and hold circuit 178 functions to sample the quadrature phase signal on line 177 at the chip rate. A clock signal for sampling at the chip rate is coupled over line 179 to the clock input of sample and hold circuits 174 and 178. The chip rate received may be in the range from 1 to 20 MHz, for example.

The output of sample and hold circuit 174 is coupled over line 180 to the data input of shift registers 181 and 182. Shift registers 181 and 182 may be, for example, a 64 bit sample dynamic analog register such as provided by a bucket brigade or charge coupled device (CCD). The output of sample and hold circuit 178 is coupled over line 183 to the data input of shift registers 184 and 185. Reference signal generator 50 provides complex binary weight references on lines 93 and 94. The in-phase binary weight references are coupled over line 93 to shift register 186 and 187. Line 94 carrying the quadrature binary weight references and coupled to the data input of shift registers 188 and 189. Registers 186-189 may be, for example, 64 bit sample static binary registers. While not shown, it is understood that an appropriate clock is coupled to shift registers 186-189 for the proper loading of shift registers 186-189. Shift register 181 has a tap at each bit location coupled to the center pole of a single pole, double throw switch. In FIG. 5A, shift register 181 has taps 191-194 shown coupled to single pole, double throw switches 195-198. Switches 195-198 are coupled across buses 199 and 200. For example, tap 191 may be coupled to bus 199 or to bus 200, depending upon the position of switch 195. Each tap of shift register 181 is coupled through a corresponding single pole, double throw switch to enable its tap to be coupled to bus 199 or to bus 200. Shift register 186 also has taps 201-204 which are coupled to switches 195 through 198 and control the position of switches 195–198. If the binary weight reference stored in shift register 186 at a particular tap, such as tap 201, is a one, the signal at the corresponding tap 191 is passed through switch 195 to bus 199. Similarly, if tap 201 stored a binary weight reference of zero, the signal at tap 191 would be coupled through switch 195 to bus 200. The voltage on bus 199 and 200 are subtracted from each other by difference amplifier 205 to provide a partial product on line 206 of the correlated signal of the complex correlator 207.

Shift register 182 has taps 208–211 which are coupled to the center terminal of switches 212 to 215, respectively. Switches 212–215 may be, for example, single pole, double throw switches. One side of switches 212–215 is coupled to bus 216. The other side of switches 212–215 are coupled to bus 217. Shift register 188 has taps 218–221 which are coupled to the control input of switches 212–215 for switching the output of taps 208–211 to either bus 216 or 217, depending upon the value of the signal on taps 218–221. Buses 216 and 217 are coupled to respective inputs of differential amplifier 218' where the voltage on bus 217 is subtracted from the voltage on bus 216. The output of differential amplifier 218' is coupled over line 219 to an input of adder 220.

Shift register 184 has taps 221–224 which are coupled to the center terminal of switches 225–228. Switches 225–228 may be single pole, double throw switches having one side coupled to bus 229 and the other side coupled to bus 230. The voltage on bus 230 is subtracted from the voltage on bus 229 by differential amplifier 231. The output of amplifier 231 is coupled over line 232 to an input of adder 220. Shift register 187 has taps 233–236 which are coupled to the control input of switches 225–228. The signals on taps 221–224 are coupled to bus 229 or 230 depending upon the respective value in the same bit position of taps 233–236.

Shift register 185 has taps 237–240 coupled to the center terminal of switches 241–244. Switches 241–244 may be, for example, single pole, double throw switches having one side coupled to bus 245 and the other side coupled to bus 246. The voltage on bus 245 is subtracted from the voltage on bus 246 by differential amplifier 247. The output of differential amplifier 247 is coupled over line 248 to an input of adder 249. Shift register 189 has taps 250–253 shown which provide a binary signal to the control input of switches of 241–244. The signal on taps 237–240 are coupled to either bus 245 or 246 as a function of the corresponding signal on taps 250–253.

The output of adder 249 is coupled over line 260 to an input of magnitude detector 261. The output of adder 220 is coupled over line 262 to a second input of magnitude detector 261. The signal on line 260 represents the in-phase component and the signal on line 262 represents the quadrature component of the product of the MSK signal and the reference signal. Magnitude detector 261 determines the magnitude of the in-phase and quadrature signal such as by taking the square root of the sum of the squares of the signals on lines 260 and 262. Alternatively, an approximation algorithm may be used such as by adding the magnitude of the largest signal to one-half the magnitude of the smallest signal. The output of magnitude detector 261 is coupled over line 263 and is the correlated output of the in-phase and quadrature components of the MSK signal on line 164 with the reference signal on lines 93 and 94.

In operation, reference signal generator 50 provides an in-phase and quadrature reference signal on lines 93 and 94, respectively. The in-phase reference signal is loaded into registers 186 and 187. Received in-phase MSK signals at baseband are continually shifted into registers 181 and 182. The quadrature reference signal is loaded into registers 188 and 189. Received quadrature phase MSK signals at baseband are continually shifted into registers 184 and 185. The respective in-phase and quadrature data is allowed to slide by the respective reference signal with maximum output on line 263, occurring at the time of alignment of the two signals.

The received MSK signals at antenna 161, shown in FIG. 5A, may not always be at a known frequency. For example, the received MSK signals may be transmitted from an aircraft moving with respect to the receiver resulting in a doppler frequency component being added to the received MSK signals; or the oscillators of the transmitter and receiver may be at different frequencies. The receiver 160 of FIGS. 5A and 5B will accept frequency variations in baseband frequency within limits dependent upon the duration $T_s$ which is the symbol length, such as the time to receive 64 chips. A fixed frequency variation from baseband frequency gives a linear change of phase of the time samples from chip to chip across the symbol. This linear change of phase is a deviation from the correct phase samples when the signals are at baseband. Thus it gives a linear change of phase from chip vector to chip vector that is caused to be coherently added together in the receiver 160 of FIGS. 5A and 5B.

Figure 6:
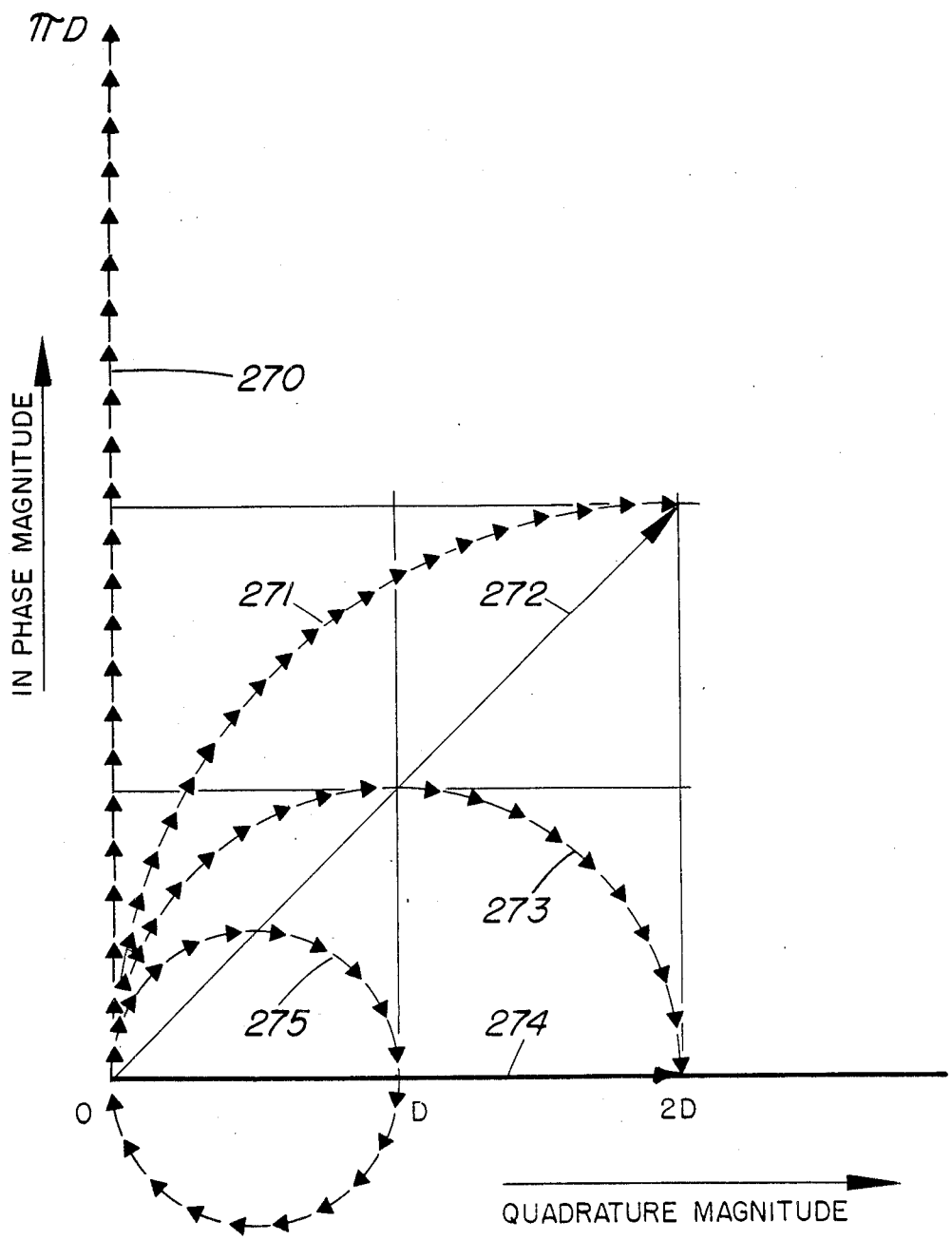
FIG. 6 is a graph showing curves of the locus of chip vectors successively added.

FIG. 6 is a graph showing the locus of chip vectors successively added over a symbol length $T_s$ for baseband frequencies, such as due to doppler of 0, $1/(4T_s)$, $1/(2T_s)$ and $1/T_s$. In FIG. 6 the ordinate represents in-phase magnitude and the abscissa represents quadrature phase magnitude. In FIG. 6 a representative number of chip vectors is shown for illustration of the resultant curve. No attempt has been made to show each chip vector of a symbol such as 64.

The locus of the successive chip vector additions forms a straight line at 0 baseband frequency as shown by curve 270 in FIG. 6. An arbitrary length of $\pi D$ has been selected for curve 270 which will subsequently be explained. The locus of the successive vector additions forms a 90° arc of a circle as shown by curve 271 when the baseband frequency is varied from 0 by $1/(4T_s)$. The resulting vector length or the magnitude is shown by arrow 272 which is $2\sqrt{2}D$ in length. The locus of the successive vector additions forms a 180° arc of a circle as shown by curve 273 when the baseband frequency is varied from 0 by $1/(2T_s)$. The resulting vector length or the magnitude is shown by arrow 274 which is $2D$ in length. The locus of the successive vector additions forms a 360° circle as shown by curve 275 when the baseband frequency is varied from 0 by $1/T_s$. When the vector additions forms a circle, the coherent gain of the successive vectors is zero. The magnitude shown by curves 270, 272 and 274 is also the value that would be observed on line 263 of FIG. 5A. in FIGS. 5A and 5B the apparatus on the right side including the shift registers, switches, amplifiers, adders, and magnitude detector form correlator 160'.

Table II shows the typical signal loss in the correlator of FIGS. 5A and 5B for 3 doppler frequencies used in FIG. 6 where $T_s$ is the symbol length in seconds. The magnitude column in Table II corresponds to the output of correlator 160' on line 163. The gain loss (db) column in Table II corresponds to a reduced magnitude output of correlator 160' on line 163.

TABLE II

| Baseband Frequency | Magnitude | Gain Loss (db) |
|---|---|---|
| 0 | $\pi D$ | 0 |
| $\frac{1}{4}T_s$ | $2\sqrt{2}\,D$ | 0.9 |
| $\frac{1}{2}T_s$ | $2\,D$ | 3.9 |
| $1/T_s$ | 0 | −Infinity |

Table II also shows the vector magnitude resulting from the addition of the chip vectors with $\pi D$ representative of the 0 doppler case. D represents the diameter of a circle, curve 275, formed by the locus of chip vectors successively added when the linear phase change from beginning to end of a symbol is 360°. $\pi D$ magnitude is simply the length of the chip vectors in the circle shown by curve 275 in FIG. 6 when the chip vectors form a straight line at 0 doppler frequency shown by curve 270.

The invention provides an apparatus and method for generating an in-phase and quadrature reference signal of a minimum shift keyed modulated waveform comprising a shift register for holding a spreading function represented by a plurality of bits, a first memory for holding samples of a sine wave function sampled at predetermined time intervals, the time intervals evenly spaced apart, a second memory for holding samples of a cosine wave function sampled at the predetermined time intervals, a counter for addressing the first and second memory as a function of time at a predetermined frequency, a clock for shifting the shift register at the frequency, an Exclusive OR circuit for combining each odd bit from the shift register with each of two consecutive output bits from the first memory to provide an in-phase reference signal and a second Exclusive OR circuit for combining each even bit from the shift register with each of two consecutive output bits from the second memory to provide a quadrature reference signal.

The invention further provides a method for receiving minimum shift keyed data signals occurring at a predetermined frequency and chip rate comprising the steps of mixing the signal with an in-phase and quadrature component of a first frequency to provide an in-phase signal and a quadrature signal, sampling the in-phase and quadrature signal at the predetermined chip rate, storing the sampled in-phase signals in first and second shift registers, storing the sampled quadrature signals in third and fourth shift registers, generating a predetermined binary code, multiplying the code by predetermined first binary weights for each chip to provide a first binary reference signal, storing the first binary reference signal in fifth and sixth shift registers, multiplying the predetermined binary code by predetermined second binary weights for each chip to provide a second binary reference signal, storing the second binary reference signal in seventh and eighth shift registers, coupling samples in the first shift register to a first bus at times the first binary reference signal in respective bit positions of the fifth shift register are a one and to a second bus at times the first binary reference signal in respective bit positions of the fifth shift register are a zero, subtracting the signal on the second bus from the first bus to provide a first signal, coupling samples in the fourth shift register to a third bus a times the second binary reference signal in respective bit positions of the eighth shift register are a one and to a fourth bus at times the second binary reference signal in respective bit positions of the eighth shift register are a zero, subtracting the signal on the third bus from the fourth bus to provide a second signal, adding the first and second signals together to provide a third signal, coupling samples in the second shift register to a fifth bus at times the second binary reference signal in respective bit positions of the seventh shift register are a one and to a sixth bus at times the second binary reference signal in respective bit positions of the seventh shift register are a zero, subtracting the signal on the sixth bus from the signal on the fifth bus to provide a fourth signal, coupling samples in the third shift register to a seventh bus at times the first binary reference signal in respective bit positions of the sixth shift register are a one and to an eighth bus at times the first binary reference signal in respective bit positions of the sixth shift register are a zero, subtracting the signal on the eighth bus from the signal on the seventh bus to provide a fifth signal, adding the fourth and fifth signals together to provide a sixth signal, generating a signal indicative of the magnitude of the third signal and the sixth signal where one signal is complex to provide a seventh signal indicative of the correlated output.

The invention claimed is:

1. Apparatus for generating an in-phase and quadrature reference signal of a minimum shift keyed modulated waveform containing a spreading function in which said reference signal will correlate with said minimum shift keyed modulated waveform comprising:
    a shift register for holding said spreading function represented by a plurality of binary bits in series, said series having odd and even numbered bits,
    a first memory for holding samples indicative of the magnitude and polarity of a sine wave function sampled at predetermined time intervals, said time intervals evenly spaced apart,
    a second memory for holding samples indicative of the magnitude and polarity of a cosine wave function sampled at said predetermined time intervals,
    means for addressing said first and second memories as a function of time at a predetermined frequency,
    means for shifting said shift register at said frequency,
    first means for combining each odd bit from said shift register with each of two consecutive output samples from said first memory to provide said in-phase reference signal and
    second means for combining each even bit from said shift register with each of two consecutive output samples from said second memory to provide said quadrature reference signal.

2. The apparatus of claim 1 wherein said means for addressing said first and second memories includes a counter.

3. The apparatus of claim 1 wherein said first memory holds samples of a sine wave function at 45°, 135°, 225° and 315°.

4. The apparatus of claim 3 wherein said first memory holds "1100" where "1" is indicative of the magnitude and polarity of sin 45° and sin 135° and where "0" is indicative of the magnitude and polarity of sin 225° and sin 315°.

5. The apparatus of claim 1 wherein said second memory holds samples of a cosine wave function at 45°, 135°, 225° and 315°.

6. The apparatus of claim 5 wherein said second memory holds "0110" where "0" is indicative of the magnitude and polarity of cosine 45° and cosine 315° and where "1" is indicative of the magnitude and polarity of cosine 135° and cosine 225°.

7. The apparatus of claim 1 wherein said first means for combining includes an Exclusive OR circuit.

8. The apparatus of claim 1 wherein said second means for combining includes an Exclusive OR circuit.

9. The apparatus of claim 1 wherein said spreading function occurs at a chipping rate $f_c$ equal to said predetermined frequency.

10. The apparatus of claim 9 wherein said sine wave function is $\sin 2\pi(f_c/4)t$ and said predetermined time interval is $1/f_c$.

11. The apparatus of claim 10 wherein said cosine wave function is $\cos 2\pi(f_c/4)t$.

12. A method for receiving minimum shift keyed data signals occurring at an apparent carrier frequency $f_o$ and containing a spreading function with a chip rate $f_c$ comprising the steps of mixing said signal with an in-phase and quadrature component of a first frequency to provide an in-phase signal and a quadrature signal, sampling said in-phase and quadrature signal at said chip rate, storing said sampled in-phase signals in first and second shift registers, storing said sampled quadrature signals in third and fourth shift registers, generating said spreading function represented by a binary code, multiplying said code by predetermined first binary weights for each chip to provide a first binary reference signal, storing said first binary reference signal in a fifth and sixth shift register, multiplying said code by predetermined second binary weights for each chip to provide a second binary reference signal, storing said second binary reference signal in a seventh and eighth shift register, coupling samples in said first shift register to a first bus at times said first binary reference signal in respective bit positions of said fifth shift register are a "one" and to a second bus at times said first binary reference signal in respective bit positions of said fifth shift register are a "zero", subtracting the signal on said second bus from said first bus to provide a first signal, coupling samples in said fourth shift register to a third bus at times said second binary reference signal in respective bit positions of said eighth shift register are a "one" and to a fourth bus at times said second binary reference signal in respective bit positions of said eighth shift register are a "zero", subtracting the signal on said fourth bus from said third bus to provide a second signal, adding said first and second signals together to provide a third signal, coupling samples in said second shift register to a fifth bus at times said second binary reference signal in respective bit positions of said seventh shift register are a "one" and to a sixth bus at times said second binary reference signal in respective bit positions of said seventh shift register are a "zero", subtracting the signal on said fifth bus from the signal on said sixth bus to provide a fourth signal, coupling samples in said third shift register to a seventh bus at times said first binary reference signal in respective bit positions of said sixth shift register are a "one" and to an eighth bus at times said first binary reference signal in respective bit positions of said sixth shift register are a "zero", subtracting the signal on said eighth bus from the signal on said seventh bus to provide a fifth signal, adding said fourth and fifth signals together to provide a sixth signal, generating a signal indicative of the magnitude of said third signal and said sixth signal to provide a seventh signal indicative of the correlation of said received minimum shift keyed data signals and said first and second binary reference signals.

13. The method of claim 12 wherein said step of multiplying said code by predetermined first binary weights for each chip includes weights selected from a sine wave function taken at 45°, 135°, 225° and 315°.

14. The method of claim 12 wherein said step of multiplying said code by predetermined secondary binary weights from each chip includes weights selected from a cosine wave function taken at 45°, 135°, 225°, and 315°.

15. The method of claim 12 wherein said step of multiplying said code by predetermined first binary weights for each chip includes multiplying by weights of equal magnitude but of opposite polarity.

16. A method for generating an in-phase and quadrature reference signal of a minimum shift keyed modulated waveform containing a spreading function with a chip rate $f_c$ in which is reference signal will correlate with said minimum shift keyed modulated waveform comprising the steps of:

holding said spreading function represented by a plurality of binary bits in series in a first memory, said series having odd and even numbered bits, holding first samples of $\sin 2\pi(f_c/4)t$ sampled at predetermined time intervals in a second memory, said time intervals evenly spaced apart, holding second samples of $\cos 2\pi(f_c/4)t$ sampled at said predetermined time intervals in a third memory, first means for combining each odd bit in said series with each of two consecutive first samples to provide said in-phase reference signal, and second means for combining each even bit in said series with each of two consecutive second samples to provide said quadrature reference signal.

17. The method of claim 16 wherein said step of holding first samples includes sampling at predetermined time intervals of $1/f_c$.

18. The method of claim 16 wherein said step of holding first samples includes holding 1100 representative of said first samples for four times intervals.

19. The method of claim 16 wherein said step of holding second samples includes holding 0110 representative of said second samples for four time intervals.

20. Apparatus for generating an in-phase and quadrature reference signal of a minimum shift keyed modulated waveform containing a spreading function with a chip rate $f_c$ in which said reference signal will correlate with said minimum shift keyed modulated waveform comprising:

first means for holding said spreading function represented by a plurality of binary bits in series in a first memory, said series having odd and even numbered bits, second means for holding first samples of $\sin 2\pi(f_c/4)t$ sampled at predetermined time intervals in a second memory, said time intervals evenly spaced apart, third means for holding second samples of cos $2\pi(f_c/4)t$ sampled at said predetermined time intervals in a third memory, fourth means for combining each odd bit in said series with each of two consecutive first samples to provide said in-phase reference signal, and fifth means for combining each even bit in said series with each of two consecutive second samples to provide said quadrature reference signal.

21. The apparatus of claim 20 wherein said predetermined time interval is $1/f_c$.

22. The apparatus of claim 20 wherein said second means for holding first samples includes holding 1100 representative of first samples for four time intervals.

23. The apparatus of claim 20 wherein said third means for holding second samples includes holding 0110 representative of second samples for four time intervals.

* * * * *